Aug. 7, 1962   A. S. ROSENBAUM   3,048,083
AUDITORY AND VISUAL ADVERTISING DEVICE
Filed Sept. 18, 1959   2 Sheets-Sheet 1

INVENTOR.
ALAN ROSENBAUM
BY
ATTORNEY

Aug. 7, 1962    A. S. ROSENBAUM    3,048,083
AUDITORY AND VISUAL ADVERTISING DEVICE

Filed Sept. 18, 1959    2 Sheets-Sheet 2

INVENTOR.
ALAN ROSENBAUM
BY
*ATTORNEY*

3,048,083
AUDITORY AND VISUAL ADVERTISING DEVICE
Alan S. Rosenbaum, 1605 Oriental Blvd., Brooklyn, N.Y.
Filed Sept. 18, 1959, Ser. No. 840,841
1 Claim. (Cl. 88—28)

This invention relates to the art of display devices and particularly concerns an apparatus for displaying a sequence of advertisements or other visual subject matter with appropriate musical or vocal accompaniment.

In a preferred embodiment of the invention there is provided an apparatus in which there is disposed a carrier or holder for a plurality of advertising views, pictures or printed text. The visual subject matter is carried on individual transparent films which are projected in sequence onto a curved screen to present a three-dimensional display. The holder of the views is advanced step-wise so that one view at a time is projected. The apparatus also includes a device for reproducing sound from an endless magnetic tape or belt. The belt has a plurality of tracks, each carrying an individual advertising or explanatory message or musical selection corresponding to one of the views. The sound reproducing device has a multiple magnetic head assembly associated with the tracks. The several heads of the assembly are connected in a switching circuit so that only one head is effective at a time to pick up a message and pass it to an amplifier and loud-speaker for reproduction. The switching circuit is actuated by a solenoid operated ratchet. The ratchet advances the view holder at the same time that the switching circuit is operated. The solenoid is energized via a control circuit including another head in the magnetic head assembly cooperating with a control track on the magnetic belt. The apparatus operates automatically and continuously to change the views and produce vocal or musical text appropriate to the view being shown.

It is therefore a principal object of the invention to provide a picture display device including means for changing the display automatically, and means for synchronously producing sounds appropriate to the picture displayed.

A further object is to provide an auditory-visual device including mechanical means for changing a picture display under control of a magnetic track on a belt or tape, the belt or tape carrying a plurality of sound tracks corresponding to the respective pictures, and circuit means for reproducing sounds from the tracks in sequence corresponding to the successive display of pictures.

A still further object is to provide an auditory-visual apparatus of the character described in which the picture display is substantially three-dimensional.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
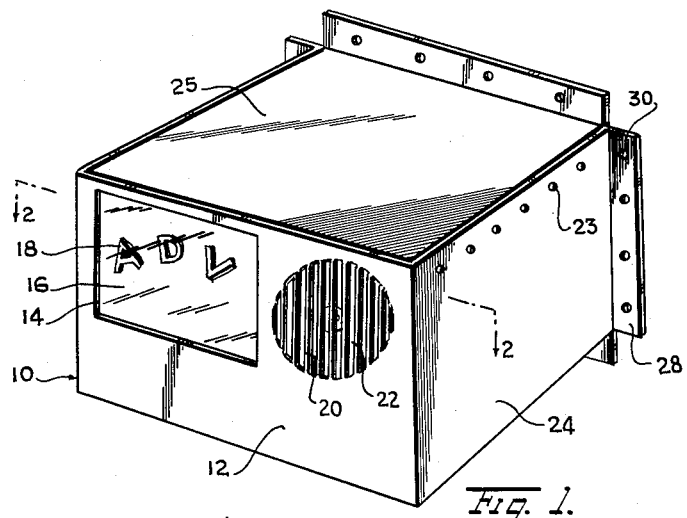
FIG. 1 is a perspective view of a cabinet housing the apparatus embodying the invention.

Referring to FIG. 1, there is shown a rectangular cabinet 10 having a front wall 12 in which is a rectangular opening 14. At the opening 14 is mounted a flat transparent plate 16 behind which is visible a pictorial view 18. Adjacent to opening 14 is formed a plurality of slots 20 serving to pass sound from a loud-speaker 22 mounted at the rear of wall 12. The side walls 24, top wall 25 and bottom wall 26 have coplanar flanges 28 at their rear ends provided with holes 30 for receiving screws or bolts so that the cabinet can be mounted on a vertical support.

Figure 2:
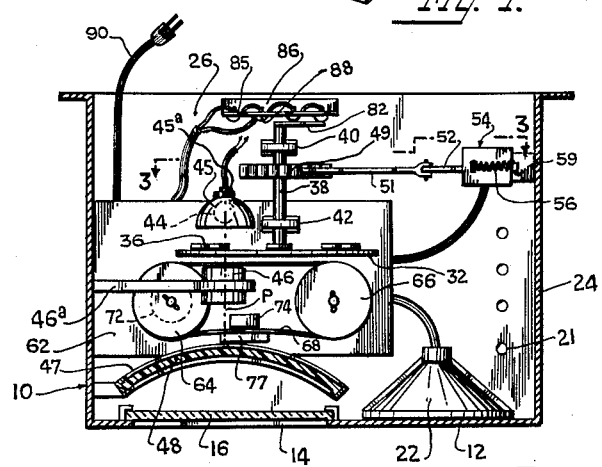
FIG. 2 is a sectional view taken on line 2—2 of FIG. 1.
Figure 3:
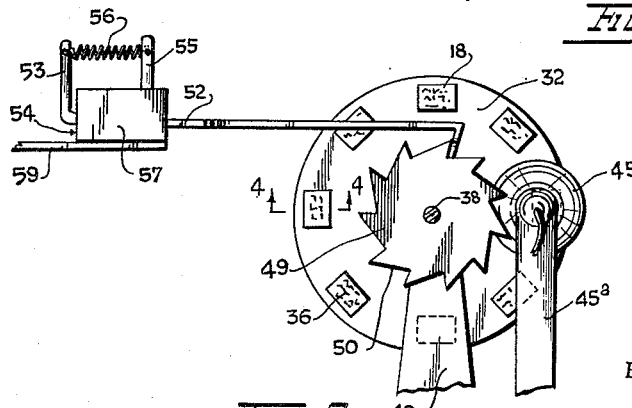
FIG. 3 is a sectional view of a portion of the apparatus taken on line 3—3 of FIG. 2.
Figure 4:
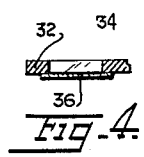
FIG. 4 is a sectional view taken on line 4—4 of FIG. 3.

In FIGS. 2, 3 and 4, there is shown a rotatable opaque disk 32. This disk has a plurality of circumferentially spaced generally rectangular openings 34 at which are secured transparent films 36. Each film carries some pictorial view or printed message 18. The disk is mounted on a shaft 38 journaled horizontally in brackets 40, 42. Located laterally of shaft 38 and behind the disk near the perimeter thereof is a projection lamp 44 mounted in a reflector 45 supported on bracket 45$^a$. The lamp is disposed at one end of an optical axis P passing through the center of one picture position of the disk. A lens system 46 is supported by bracket 46$^a$ on axis P in front of the disk to receive light passing through a selected film 36 from lamp 44. The lens system projects the pictorial view in enlarged form on a curved, translucent plastic screen 48 supported by bracket 47 behind plate 16. The projected, enlarged view appears three-dimensional to a person viewing the screen.

Shaft 38 also carries a ratchet wheel 49 having teeth 50 disposed to be engaged by a pivotable hook 51 mounted on the end of a plunger 52 slidably carried by a solenoid 54. A spring 56 secured between arms 53 and 55 on the plunger and housing 57 of the solenoid serves to return the plunger to its initial position as shown in FIGS. 2 and 3 after actuation thereof. The solenoid housing is carried on arm 59 attached to one side wall of the cabinet.

Figure 5:
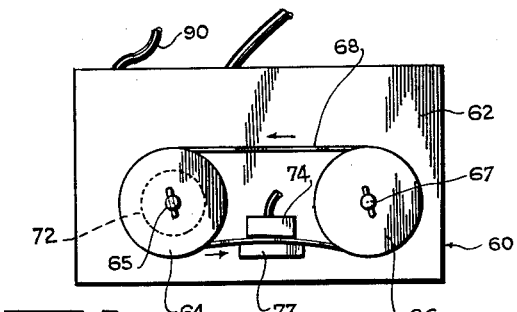
FIG. 5 is a top plan view of a portion of a magnetic tape reproducing device employed in the apparatus.

On the bottom wall 26 is mounted a sound reproducing device 60. This device, as best shown in FIG. 5, includes a base 62 containing electrical and mechanical components. On top of the base are mounted two pulleys 64, 66 rotatably carried on spindles 65, 67 and driven by motor 72. The pulleys carry an endless, flexible plastic belt 68 coated with a magnetic material such as iron oxide. The belt is advanced continuously in one direction A at constant speed. A magnetic head assembly 74 having eight signal heads H and a control head H' is disposed in the path of the belt between the pulleys for picking up signals therefrom. A pressure pad 77 guides the belt as it passes the assembly 74.

Figure 6:
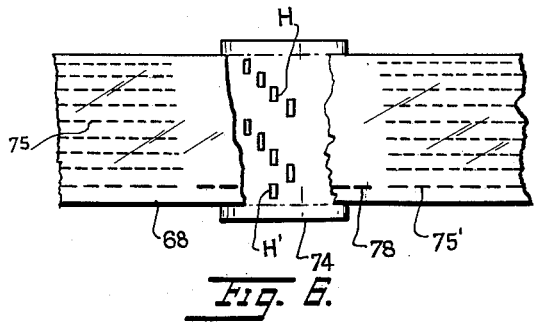
FIG. 6 is an elevational view on an enlarged scale of a portion of a magnetic belt employed in the sound reproducing device, with associated components shown schematically.

On the belt 68 are a plurality of magnetized sound tracks 75 as indicated in FIG. 6. There are as many sound tracks as there are pictures or messages on disk 32. In addition there is provided a control track 75' which is impressed with a control signal 78. Heads H pick up signals continuously from the several sound tracks. Head H' picks up the control signal 78 only at one position of the belt at the head assembly. This is just in advance of the start of the message signals on the several sound tracks.

Figure 7:
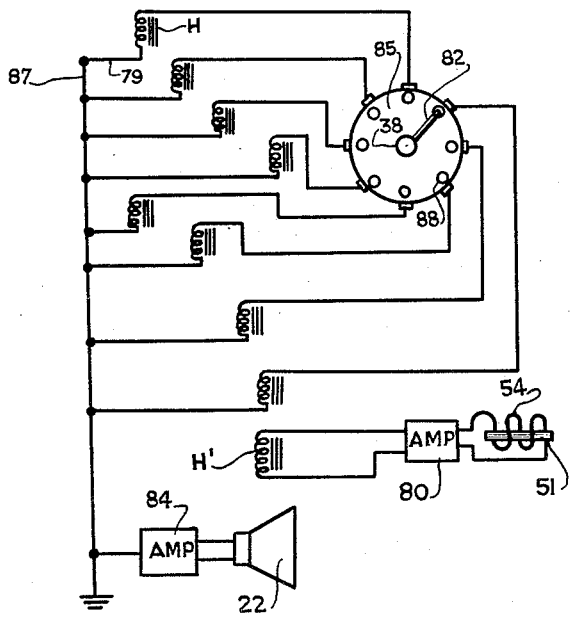
FIG. 7 is a schematic diagram of sound switching circuit employed in the apparatus.

The apparatus includes a control circuit including head H', amplifier 80 and solenoid 54 as shown in FIG. 7. Each time the control signal reaches head H' as the belt is advanced, the solenoid is energized and the plunger 52 is retracted to advance the ratchet wheel 49 and disk 32 one step angularly to place a new picture in position for projection on the screen 48.

Mounted on shaft 38 is an electrically conductive arm 82 as shown in FIGS. 2 and 7. This arm is electrically in circuit with an amplifier 84 which drives loud-speaker 22 to which the amplifier is connected. Arm 82 rotates against an insulation disk 85 supported in a fixed position by bracket 86. The disk carries a plurality of circumferentially spaced electrical contacts 88 respectively connected to the several heads H in the head assembly. One terminal 79 of each head H is connected to the common grounded line 87 terminating at amplifier 84.

In operation of the apparatus, the belt is driven continuously as previously mentioned. Each time head H' picks up the control signal 78, the solenoid 54 is energized and the ratchet wheel is actuated to advance the disk 32 and present the next picture for projection on screen 48. As the belt advances the control signal past the head assembly, the message signal tracks reach the head assembly. Only one head H is effective to excite the amplifier 84 since only one head at a time is connected thereto via the arm 82 and the particular contact 88 contacted by the arm at each position of the shaft 38. As the belt advances, the message picked up from the track 75 corresponding to the picture being displayed is reproduced by loud-speaker 22. When the control signal 78 again reaches the head H', the sound stops because the sound tracks are interrupted at this location. The picture is then changed automatically, the switch 82, 88 places the next head H in the sound reproducing circuit and the next sound track is reproduced corresponding to the next picture.

In a practical embodiment, the distance between centers of the pulleys 64, 66 may be about fifteen inches and the belt 68 may be about thirty-six inches long. The sound tracks 75 may be about thirty inches long and the intervening control signal track may be about four inches long. If the belt advances about two inches per second, then each message will be reproduced for about fifteen seconds. The period allowed for operation of the control circuit will be about two seconds occurring between the fifteen second picture display and sound reproducing intervals. The duration of the message and picture change intervals can be shorter or longer as desired, and more or less than the eight pictures, and sound tracks may be provided.

The open back of the cabinet 10 will be closed by a building wall or other suitable vertical stationary support. Power for energizing the lamp 44, amplifiers 80, 84, and motor 72 may be provided via cable 90 from a conventional power outlet at the support for the cabinet. Holes 21, 23 may be provided in the bottom 26 and side walls 24 for ventilating the cabinet.

There has thus been provided according to the invention a changing three-dimensional display of pictures accompanied by appropriate sound signals. This picture display and sound signal changes automatically and continuously at predetermined time intervals.

The apparatus can be mounted and installed in street displays, public places such as hotel lobbies, railroad, bus and airline terminals, etc. The apparatus can be used as a visual aid for educational purposes in addition to use as an advertising and mechandising means, and for other purposes.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

An apparatus of the kind described, comprising a rotatable disk carrying a plurality of circumferentially spaced pictorial elements, optical means for displaying each of said elements on a screen, mechanical means for rotating said disk intermittently to position each of said elements in turn for display by said optical means, switch means having a plurality of fixed contacts and a rotatable arm, said arm being rotated by said mechanical means in coordination with said disk to each of said contacts in turn, an endless belt having a sound track and sound head for each pictorial element, and having means for actuating said mechanical means to rotate said disk and to advance successive elements for display by said optical means, said tracks being disposed parallel to each other on the belt, said tracks having spaced opposite ends, said sound heads being disposed on the belt in the space between said ends of the tracks, said screen being a translucent, curved optical member for displaying said elements in three dimensions, said mechanical means including a ratchet wheel mounted on a shaft carrying said disk, said control means including a solenoid in circuit with magnetic control head and a plunger operatively connected to engage and advance said ratchet wheel when the solenoid is energized, whereby said arm is rotated to each of said contacts in turn.

References Cited in the file of this patent

UNITED STATES PATENTS

| | | |
|---|---|---|
| 2,127,724 | Fowler | Aug. 23, 1938 |
| 2,514,578 | Heller et al. | July 11, 1950 |
| 2,584,421 | Brenchley et al. | Feb. 5, 1952 |
| 2,615,993 | Carter | Oct. 28, 1952 |
| 2,618,197 | Boushey | Nov. 18, 1952 |
| 2,699,089 | Jakobs et al. | Jan. 11, 1955 |

FOREIGN PATENTS

| | | |
|---|---|---|
| 24,103 | Australia | Aug. 24, 1936 |